United States Patent
Nakai et al.

(10) Patent No.: US 8,660,767 B2
(45) Date of Patent: Feb. 25, 2014

(54) APPARATUS AND SYSTEM FOR CONTROLLING AUTOMATIC STOPPING OF VEHICLE

(75) Inventors: Yasuhiro Nakai, Kariya (JP); Shotaro Fukuda, Oobu (JP); Satoshi Niwa, Nagoya (JP); Hajime Kumabe, Kariya (JP); Yukio Mori, Kariya (JP); Hiroyuki Kodama, Kariya (JP); Takahisa Yokoyama, Anjo (JP)

(73) Assignee: DENSO CORPORATION, Kariya (JP)

( * ) Notice: Subject to any disclaimer, the term of this patent is extended or adjusted under 35 U.S.C. 154(b) by 1110 days.

(21) Appl. No.: 12/188,610

(22) Filed: Aug. 8, 2008

(65) Prior Publication Data
US 2009/0043474 A1 Feb. 12, 2009

(30) Foreign Application Priority Data
Aug. 10, 2007 (JP) .................................. 2007-209242

(51) Int. Cl.
*B60K 31/00* (2006.01)
(52) U.S. Cl.
USPC .............. 701/70; 180/338; 180/170; 180/282
(58) Field of Classification Search
USPC .................. 701/70, 93; 477/92; 180/170, 282
IPC ........................ B60W 30/14,10/00; B60K 31/00
See application file for complete search history.

(56) References Cited

U.S. PATENT DOCUMENTS

| | | | | |
|---|---|---|---|---|
| 6,059,067 A * | 5/2000 | Shibahata et al. | ............ | 180/338 |
| 6,161,073 A | 12/2000 | Tange et al. | | |
| 6,324,465 B1 * | 11/2001 | Teramura et al. | ............... | 701/96 |
| 6,804,594 B1 * | 10/2004 | Chen et al. | ...................... | 701/42 |
| 7,191,047 B2 * | 3/2007 | Chen et al. | ....................... | 701/70 |
| 7,277,764 B2 * | 10/2007 | Hovakimyan et al. | .......... | 700/28 |
| 7,562,948 B2 * | 7/2009 | Matsumoto et al. | .......... | 303/146 |
| 7,568,547 B2 * | 8/2009 | Yamada et al. | ............... | 180/306 |
| 7,568,996 B2 * | 8/2009 | Matsui et al. | .................... | 477/46 |
| 7,630,819 B2 * | 12/2009 | Sekiguchi | ........................ | 701/96 |
| 7,634,346 B2 * | 12/2009 | Abe | ................................ | 701/96 |

(Continued)

FOREIGN PATENT DOCUMENTS

| | | |
|---|---|---|
| JP | A-04-278872 | 10/1992 |
| JP | A-H06-173729 | 6/1994 |

(Continued)

OTHER PUBLICATIONS

Se-Han Lee, T.A. Lasky, S.A. Velinsky, "Improved velocity estimation for low-speed and transient regimes using low-resolution encoders", vol. 9 , Issue: 3, Publication Year: 2004 , pp. 553-560.*

(Continued)

*Primary Examiner* — Tuan C. To
(74) *Attorney, Agent, or Firm* — Posz Law Group, PLC

(57) ABSTRACT

A control apparatus is provided to control the stopping of a vehicle. The control apparatus comprises a speed detector that detects a speed of a vehicle, speed acquiring means, target setting means, and control means. The speed acquiring means acquires an actual speed of the vehicle from detected results of the speed detector. The target setting means sets a target acceleration of the vehicle depending on the actual speed when the vehicle is stopped automatically. The control means controls an actual acceleration of the vehicle at the target acceleration.

2 Claims, 11 Drawing Sheets

(56) References Cited

U.S. PATENT DOCUMENTS

| | | | |
|---|---|---|---|
| 7,743,866 B2* | 6/2010 | Proemm | 180/170 |
| 7,801,658 B2* | 9/2010 | Ohshima | 701/93 |
| 8,024,099 B2* | 9/2011 | Suzuki et al. | 701/70 |
| 8,027,765 B2* | 9/2011 | Urababa et al. | 701/38 |
| 8,088,036 B2* | 1/2012 | Fuchs et al. | 477/37 |
| 8,160,795 B2* | 4/2012 | Iwatsuki et al. | 701/72 |
| 8,226,527 B2* | 7/2012 | Unno | 477/44 |
| 8,257,213 B2* | 9/2012 | Komada et al. | 475/5 |
| 2004/0040765 A1* | 3/2004 | Satou et al. | 180/170 |
| 2004/0193345 A1* | 9/2004 | Chen et al. | 701/42 |
| 2005/0017577 A1* | 1/2005 | Eckert et al. | 303/123 |
| 2005/0218718 A1* | 10/2005 | Iwatsuki et al. | 303/177 |
| 2005/0225170 A1* | 10/2005 | Tsunehara | 303/155 |
| 2005/0264103 A1 | 12/2005 | Kahrs et al. | |
| 2005/0278077 A1* | 12/2005 | Shin et al. | 701/1 |
| 2006/0069489 A1* | 3/2006 | Chen et al. | 701/70 |
| 2008/0001476 A1* | 1/2008 | Franzke et al. | 303/177 |
| 2009/0160389 A1* | 6/2009 | Denk et al. | 318/573 |

FOREIGN PATENT DOCUMENTS

| | | | |
|---|---|---|---|
| JP | 10001037 A * | 1/1998 | |
| JP | A-H10-250408 | 9/1998 | |
| JP | A-H11-034695 | 2/1999 | |
| JP | A-11-278096 | 10/1999 | |
| JP | A-2000-025487 | 1/2000 | |
| JP | A-2003-048461 | 2/2003 | |
| JP | A-2003-276587 | 10/2003 | |
| JP | A-2005-528069 | 9/2005 | |
| JP | A-2006-506270 | 2/2006 | |
| JP | A-2006-193158 | 7/2006 | |
| JP | 2007028755 A * | 2/2007 | |

OTHER PUBLICATIONS

Kobayashi, K., Cheok, K.C., Watanabe, K., "Estimation of absolute vehicle speed using fuzzy logic rule-based Kalman filter", vol. 5, Publication Year: 1995 , pp. 3086-3090.*

Office Action mailed Mar. 6, 2012 in corresponding JP Application No. 2007-209242 (and English translation).

* cited by examiner

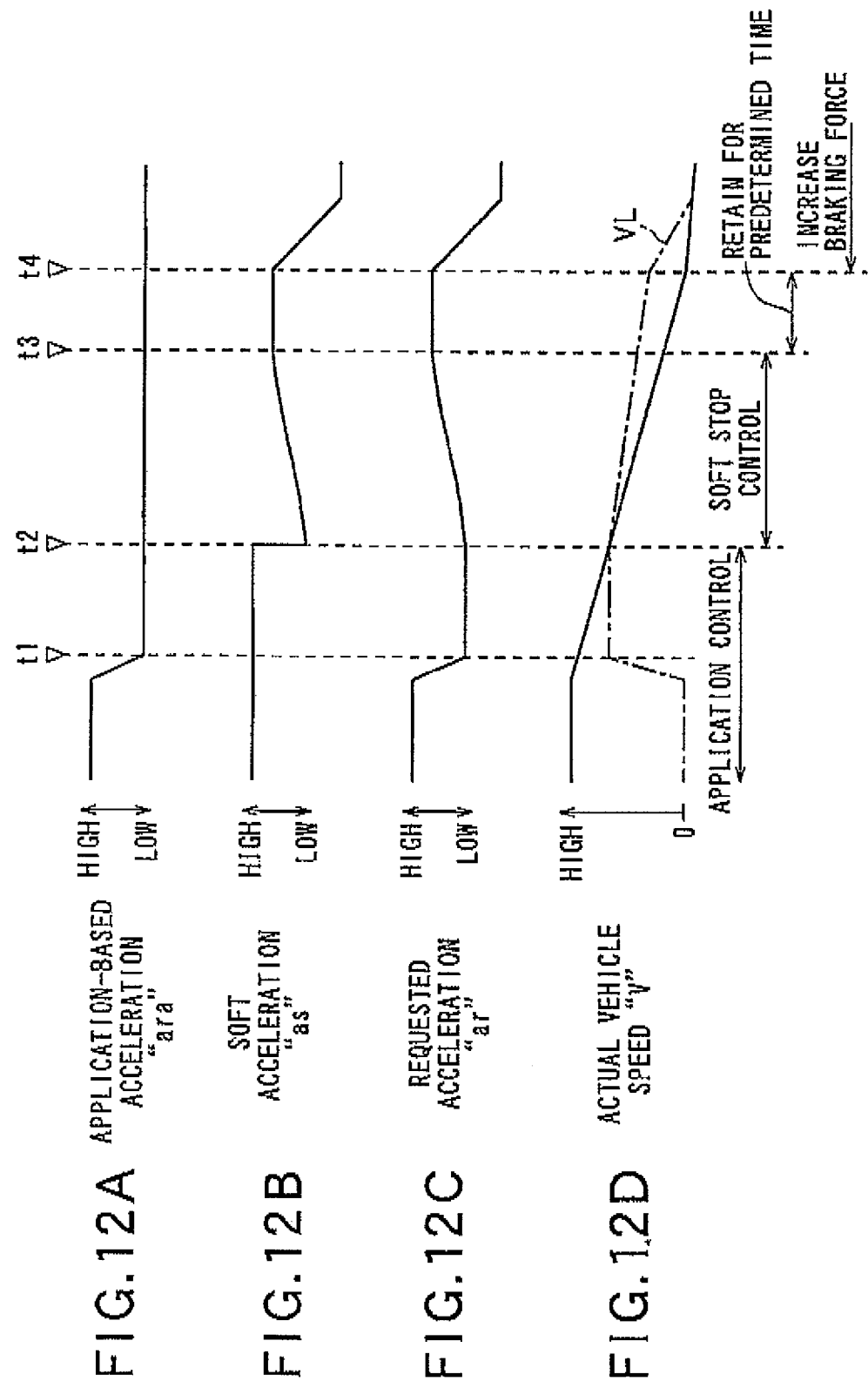

APPARATUS AND SYSTEM FOR CONTROLLING AUTOMATIC STOPPING OF VEHICLE

CROSS-REFERENCE TO RELATED APPLICATION

This application is based on and claims the benefit of priority from earlier Japanese Patent Application No. 2007-209242 filed Aug. 10, 2007, the description of which is incorporated herein by reference.

BACKGROUND OF THE INVENTION

1. Technical Field of the Invention

The present invention relates to an apparatus and system for controlling automatic stopping of a vehicle, and in particular, to the apparatus and system for controlling vehicle acceleration when the vehicle is automatically stopped.

2. Related Art

This type of control apparatus is disclosed, for example, in Japanese Patent No. 3697904. This literature suggests that, in controlling the distance between the vehicle and a preceding vehicle to a desired distance, a brake actuator is operated, when a target value (target vehicle speed) of the travel speed (vehicle speed) becomes equal to or lower than a stop control starting speed, so that a predetermined braking force can be generated. Thus, possible delay in detecting the vehicle speed may not cause adverse effects on reliably stopping the vehicle at appropriate timing.

When a user manually drives a vehicle, the vehicle is typically operated to mitigate the shock in stopping the vehicle. Thus, in automatically stopping the vehicle as well, it is desired that the shock in stopping the vehicle is mitigated. However, with the conventional technique mentioned above, it is difficult to mitigate the shock caused in stopping a vehicle.

SUMMARY OF THE INVENTION

The present invention has been made in order to solve the issue mentioned above, and has as its object to provide a stop control apparatus and system for vehicles, which are able to properly mitigate the shock accompanying in automatically stopping a vehicle.

In order to achieve the above object, there is provided a control apparatus for controlling stopping of a vehicle, comprising: a speed detector that detects a speed of a vehicle; speed acquiring means for acquiring an actual speed of the vehicle from detected results of the speed detector; target setting means for setting a target acceleration of the vehicle depending on the actual speed when the vehicle is stopped; and control means for controlling an actual acceleration (for example, acceleration caused in the longitudinal direction (back-and-forth direction or front-rear direction) of the vehicle at the target acceleration.

In this configuration, the target acceleration is set according to the actual vehicle speed. Thus, in stopping the vehicle, the setting of the target acceleration enables control for preventing the absolute value of the actual acceleration from being excessively increased, or in other words, enables control for preventing deceleration from becoming excessively fast. Thus, the shock that would be caused in stopping the vehicle can be properly mitigated.

Preferably, the target setting means is configured to set the target acceleration so that an absolute value of the target acceleration decreases as the actual speed decrease.

In this configuration, the absolute value of the target acceleration is decreased as the actual vehicle speed is decreased. That is, the more the actual vehicle speed is decreased, the more the control for slowing deceleration is possible. Thus, the shock that would be caused in stopping the vehicle can be properly mitigated.

Still preferably, the target setting means has a vehicle model to which different target acceleration patterns depending on different travels speeds of the vehicle are given and from which travel speeds and accelerations are outputted depending on the inputted target acceleration patterns, and the target acceleration is adapted based on both the travel speeds and the accelerations outputted from the vehicle model.

Even when the target acceleration is set for every travel speed of the vehicle, a considerable response delay may be caused in controlling the actual acceleration to the target acceleration. Accordingly, the locus of the actual travel speed and the actual acceleration is likely to be deviated from that set by the target value setting means. Depending on the degree of the deviation, there is a concern that a sufficient reduction of the shock in stopping the vehicle may be difficult. In this regard, in the above configuration, various patterns are inputted to a vehicle model (model representing the response characteristics of a vehicle to be controlled), as to the target value of acceleration for every travel speed. Then, the target acceleration is matched, based on the outputted pattern of the travel speed and the acceleration. The pattern outputted from the vehicle model corresponds to the locus of the travel speed and acceleration of the vehicle controlled by the inputted pattern. Thus, the target acceleration can be set so that the actual vehicle can present a desired locus as to the travel speed and the acceleration.

It is preferred that the control apparatus comprising an acceleration detector that detects an acceleration of a vehicle; and acceleration acquiring means for acquiring an actual acceleration of the vehicle from the detected acceleration of the acceleration detector, wherein the control means comprises means for converting the target acceleration into an acceleration by using a reference model of the vehicle, feedback control means for applying feedback control to the actual acceleration so that the actual acceleration complies with the acceleration converted by using the reference model, and feedforward control means for applying feedforward control to the actual acceleration depending on the target acceleration.

In this configuration, two-degree freedom control is used, in which the feedback control and the feedforward control are combined, so that the actual acceleration can be controlled to the target acceleration with high accuracy. It is desirable that the reference model is used as the vehicle model.

It is preferred that the reference model is a mathematical model in which a response delay of the vehicle to the target acceleration is modeled in a situation where the vehicle is an object to be controlled.

In this configuration, a model having the response delay of the vehicle to be controlled is used as the reference model. Thus, the actual acceleration that can be estimated in controlling the acceleration of the vehicle to the target acceleration, can be rendered to be the reference model. Thus, proper control can be effected without excessively increasing the feedback manipulated variable.

By way of example, the reference model is set based on a response characteristic of the vehicle which appears when the response delay for a change in the target acceleration is maximum.

In this configuration, the reference model is set based on the response characteristics at the time when the response delay of the vehicle is maximized. Thus, the actual acceleration of the vehicle can be controlled to follow up the reference model, in every operating condition of the vehicle. Thus, control can be easily and properly effected, while the feedback manipulated variable can be prevented from becoming excessively large.

Preferably, the acceleration detector comprises a sensor to detect a rotational speed of a wheel of the vehicle and means for differentiating the rotational speed to produce the actual acceleration, and the feedback control means is configured to perform the feedback control by applying the same filtering process to the actual acceleration outputted from the acceleration acquiring means and the acceleration outputted from the referenced model.

The detection value of the rotational speed of a wheel includes noise caused by the roughness of the road surface, for example. Therefore, the detection values fluctuate at fine time scales. For this reason, it is likely that the time-differential operation value based on the detection value of the rotational speed of the vehicle may be considerably influenced by the fluctuation. Thus, instead of directly using the time-differential operation value as an acceleration of the vehicle, the value is desired to be subjected to filtering process. However, since a delay may be caused in performing such a filtering process, it may be difficult to control the actual acceleration to the acceleration determined by the reference model. In this regard, in the above configuration, the output of the reference model is also subjected to the same filtering process. This can compensate the influence of the delay, which is caused by the filtering process, on the time-differential operation value based on the detection value. At the same time, feedback control can be performed to realize the acceleration determined by the reference model.

Still preferably, the target setting means is configured to fix the target acceleration over a predetermined period of time when the actual speed of the vehicle is below a predetermined threshold.

When the actual vehicle speed is approximated to zero, it is difficult to detect the rotational speed of a wheel with high accuracy. That is, it is difficult to detect the actual vehicle speed with high accuracy. Thus, under such conditions, a target acceleration cannot be properly set. In the above configuration, when the actual vehicle speed is equal to or lower than a predetermined speed, the target acceleration is fixed over a predetermined time period. Thus, in the case where the actual vehicle speed is equal to or lower than a predetermined speed, the target acceleration can be prevented from having an excessively improper value.

The absolute value of the target acceleration may be increased after fixing the target acceleration.

It is also preferred that the control apparatus comprise an acceleration detector that detects an acceleration of a vehicle; acceleration acquiring means for acquiring an actual acceleration of the vehicle from the detected acceleration of the acceleration detector; determining means for determining, based on the actual acceleration and the actual speed, whether or not it is a time when the control means should start the control of the actual acceleration, wherein the determining means is configured to determine the start of the control of the control means at timing providing the actual speed whose absolute value is made smaller as the actual acceleration becomes smaller in an absolute value thereof.

When deceleration of a vehicle is slow, the time required for zeroing the vehicle speed is prolonged. Therefore, if control is switched to the controlling means at an earlier stage of the slow deceleration, the time required for the vehicle to actually stop is likely to be prolonged. Contrarily, if deceleration is fast, the time required for the vehicle speed to be zeroed will be short. Therefore, if control is switched to the controlling means at a later stage of the fast deceleration, the vehicle is stopped in the state of the fast deceleration, which may cause a large shock to the vehicle. In this regard, by permitting the control to be shifted to the controlling means at lower vehicle speed as the absolute value of the actual acceleration becomes smaller, the deceleration can be reliably slowed down while the vehicle speed is approximated to zero. In addition, the vehicle can be properly prevented from causing a shock, and at the same time, the time required for stopping the vehicle can be prevented from being prolonged.

BRIEF DESCRIPTION OF THE DRAWINGS

In the accompanying drawings:

FIGS. 12A to 12D are timing diagrams illustrating a mode of the stop control.

DETAILED DESCRIPTION OF THE PREFERRED EMBODIMENTS

With reference to the accompanying drawings, hereinafter will be described a vehicle control apparatus according to an embodiment of the present invention with reference to FIGS. 1-12A to 12D.

Figure 1:
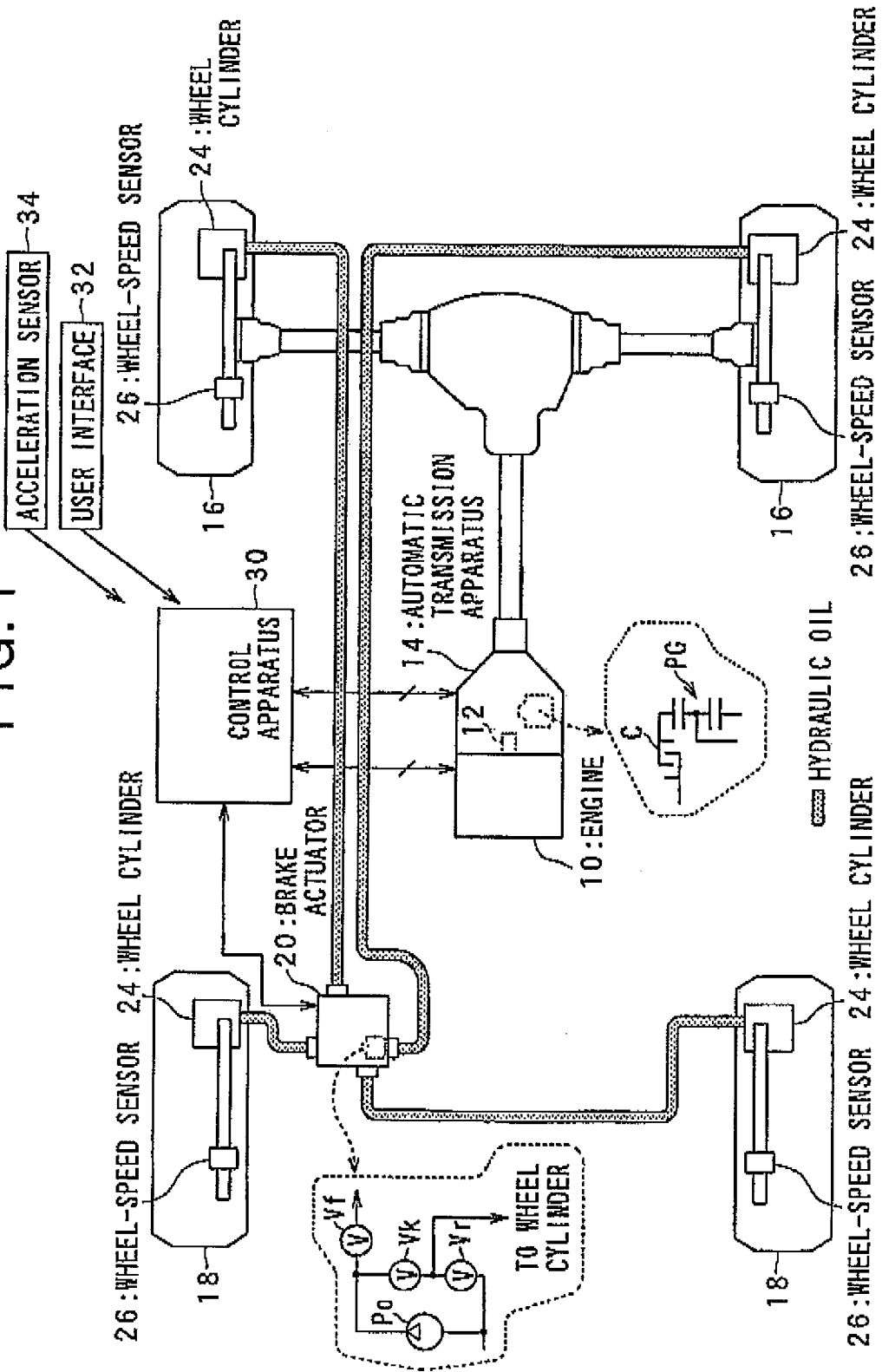
FIG. 1 illustrates a general configuration of a vehicle control system, according to an embodiment of the present invention.

FIG. 1 illustrates a general configuration of the vehicle control system including the vehicle control apparatus for the automatic stopping of a vehicle, according to the present embodiment.

An engine 10, a gasoline powered internal combustion engine, includes a crank shaft 12 to which an automatic transmission system 14 is connected. The automatic transmission system 14 is provided with a torque converter and a planetary gear automatic transmission. In the planetary gear automatic transmission, any of a plurality of power transmission paths formed by planetary gears PG is selected, depending on the engagement conditions of a clutch C and a brake (not shown) as friction elements. The planetary gear automatic transmission is adapted to realize a gear ratio according to the selected power transmission path. The torque of the crank shaft 12 of the engine 10 is changed by the automatic transmission system 14 and then transmitted to drive wheels 16.

The drive wheels 16 and idler wheels 18 can be imparted with braking force by a hydraulic brake actuator 20. In addition to an electrical pump Po, the brake actuator 20 is provided with a retention valve Vk and a decompression valve Vr, for each of the wheels (the drive wheels 16 and the idler wheels 18). The retention valve Vk retains the pressure of the hydraulic oil supplied to a wheel cylinder 24, and the decompression valve Vr reduces the pressure of the hydraulic oil in the wheel cylinder 24. The brake actuator 20 is also provided with a linear relief valve Vf for causing pressure difference between the side of a master cylinder, not shown, and the side of the wheel cylinder 24. The discharge side of the pump Po is connected to the suction side of the pump Po via the retention valve Vk and the decompression valve Vr. The hydraulic oil flows in/out between the connected portion of the retention valve Vk and the decompression valve Vr, and the wheel cylinder 24.

The operation of the linear relief valve Vf, the retention valve Vk and the decompression valve Vr can realize automatic brake control which is performed independent of the user's brake operation which realizes anti-brake lock braking control (ABS), traction control and skid prevention control, for example. Specifically, in retaining braking force, the pressure of the hydraulic oil in the wheel cylinder 24 is retained by closing both of the retention valve Vk and the decompression valve Vr. In decreasing braking force, the pressure in the wheel cylinder 24 is lowered by closing the retention valve Vk and opening the decompression valve Vr.

In increasing braking force, the pressure of the hydraulic oil supplied to the wheel cylinder 24 is raised by opening the linear relief valve Vf and the retention valve Vk and closing the decompression valve Vr. In this case, the pressure in the wheel cylinder 24 is controlled by controlling the current supply for the linear relief valve Vf. Specifically, the linear relief valve Vf is adapted to cause pressure difference between the side of the master cylinder and the side of the wheel cylinder 24, as mentioned above, in proportion to the amount of current supply. Accordingly, the pressure difference can be adjusted according to the amount of current supply, which is eventually led to the pressure control in the wheel cylinder 24. In particular, in the case where the user's brake operation for realizing skid prevention control, for example, is not performed, the pump Po is actuated to produce a pressure to be applied into the wheel cylinder 24, while at the same time, the pressure is adjusted according to the amount of current supply to the linear relief valve Vf.

In this regard, hysteresis may be caused to the pressure difference between the side of the master cylinder and the side of the wheel cylinder 24, accompanying the increase and decrease in the amount of current supply mentioned above. In order to reduce the hysteresis, the operation of current supply to the linear relief valve Vf is carried out based on time-ratio control for adjusting time ratio between logic "H" and logic "L" of applied voltage (the ratio of logic "H" to the time periods of logic "H" and logic "L": duty). The frequency (dither frequency) of the time-ratio control ranges from about "1 kHz" to "several kHz's", for example.

Each of the drive wheels 16 and the idler wheels 18 is provided with a wheel-speed sensor 26 for detecting the rotational speed of the wheel.

A control apparatus 30, which is for example provided with a CPU (central processing unit) and memories to compose a computer system for the control, controls the travel conditions of the vehicle. Specifically, the control apparatus 30 retrieves detection values of various sensors for detecting the operating conditions of the engine 10 and the automatic transmission system 14, as well as the output signals of the wheel-speed sensors 26, a user interface 32 and an acceleration sensor 34 to control traveling of the vehicle based on these values and signals. The user interface 32 includes an automatic travel switch through which the user can request automatic travel of the vehicle, and an accelerator operating member through which the user can request torque increase to the engine 10. The accelerator sensor 34 is adapted to detect acceleration (for example, acceleration caused in the longitudinal direction of the vehicle) based on the force applied to the sensor per se. A pendulum type or strain-gauge type sensor, for example, can serve as the accelerator sensor 34.

When a request for automatic travel is inputted by the user through the user interface 32, the control apparatus 30 controls the actual speed (actual acceleration) of the vehicle to a target value (target acceleration). The details are provided below.

Figure 2:
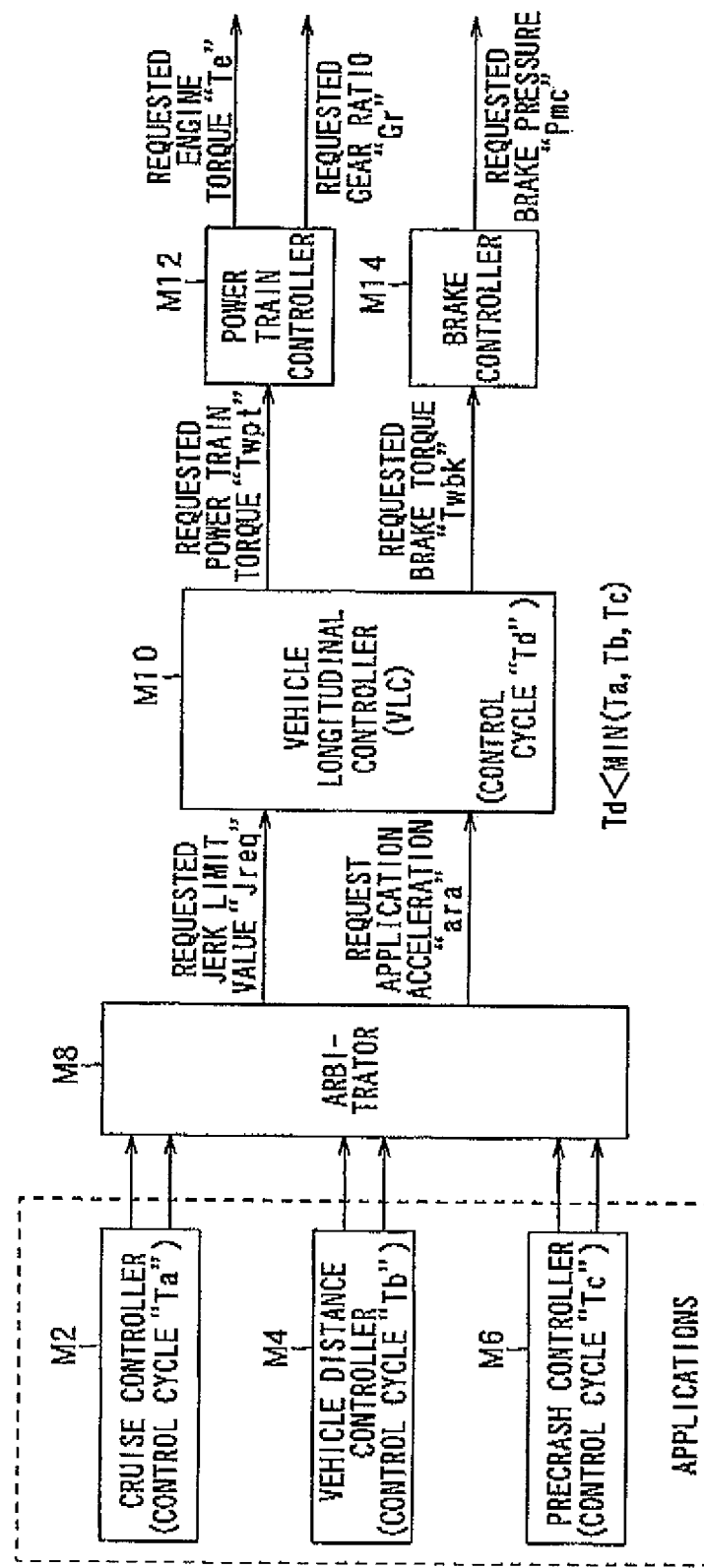
FIG. 2 is a block diagram illustrating the processes concerning automatic travel control, according to the embodiment.

FIG. 2 shows the processes associated, in particular, with the automatic travel control, among the processes performed by the control apparatus 30.

FIG. 2 exemplifies such automatic travel applications as a cruise controller M2, a vehicle distance (intervehicle) controller M4 and a precrash controller M6. The cruise controller M2 controls the travel speed of the vehicle to be kept at a certain level. The vehicle distance controller M4 controls the distance between the vehicle and a preceding vehicle to a predetermined distance. The precrash controller MG controls the shock of possible collision with the preceding vehicle to be so mitigated. The cruise controller M2, the vehicle distance controller M4 and the precrash controller M6 all output a requested value of acceleration (requested acceleration) and a requested limit value of jerk that will be described later.

An arbitrator M8 outputs a finally requested jerk limit value "Jreq" and a requested acceleration (application-based acceleration "ara") based on the outputs from the cruise controller M2, the vehicle distance controller M4 and the precrash controller M6, which are provided as various applications for the control apparatus.

A vehicle longitudinal controller (VLC) M10 outputs: a requested power-train torque "Twpt" which is a torque requested for the power train comprising the engine 10 and the automatic transmission system 14; and a requested brake torque "Twbk" which is a torque requested for the brake actuator 20. A control cycle "Td" of the vehicle longitudinal controller M10 is different from a control cycle "Ta" of the cruise controller M2, a control cycle "Tb" of the vehicle distance controller M4 and a control cycle "Tc" of the precrash controller M6. Specifically, the cycle "Td" of the vehicle longitudinal controller M10 is set shorter than the cycle "Ta" of the cruise controller M2, the cycle "Tb" of the vehicle distance controller M4 and the cycle "Tc" of the precrash controller M6. This is because the applications are adapted to calculate requested acceleration based on various detection values obtained from detecting means, such as one which detects a preceding vehicle by radar, and thus because the detection cycles of these detecting means tend to be longer than the detection cycles of actual vehicle speed and actual acceleration (for example, acceleration caused in the longitudinal direction of the vehicle).

A power train controller M12 outputs a requested value of torque for the engine 10 (requested engine torque "Te"), and a requested value of gear ratio for the automatic transmission system 14 (requested gear ratio "Gr"), in response to the requested power train torque "Twpt". A brake controller M14 outputs a requested value of hydraulic oil pressure so for the brake actuator 20 (requested brake pressure "Pmc"), in response to the requested brake torque "Twbk". It should be appreciated that the requested brake pressure "Pmc" is a manipulated variable of the brake actuator 20 which adjusts, through the hydraulic oil pressure, the braking force in each of the drive wheels 16 and the idler wheels 18.

All the controllers and arbitrator are, for example, functionally realized by the computer system.

Figure 3:
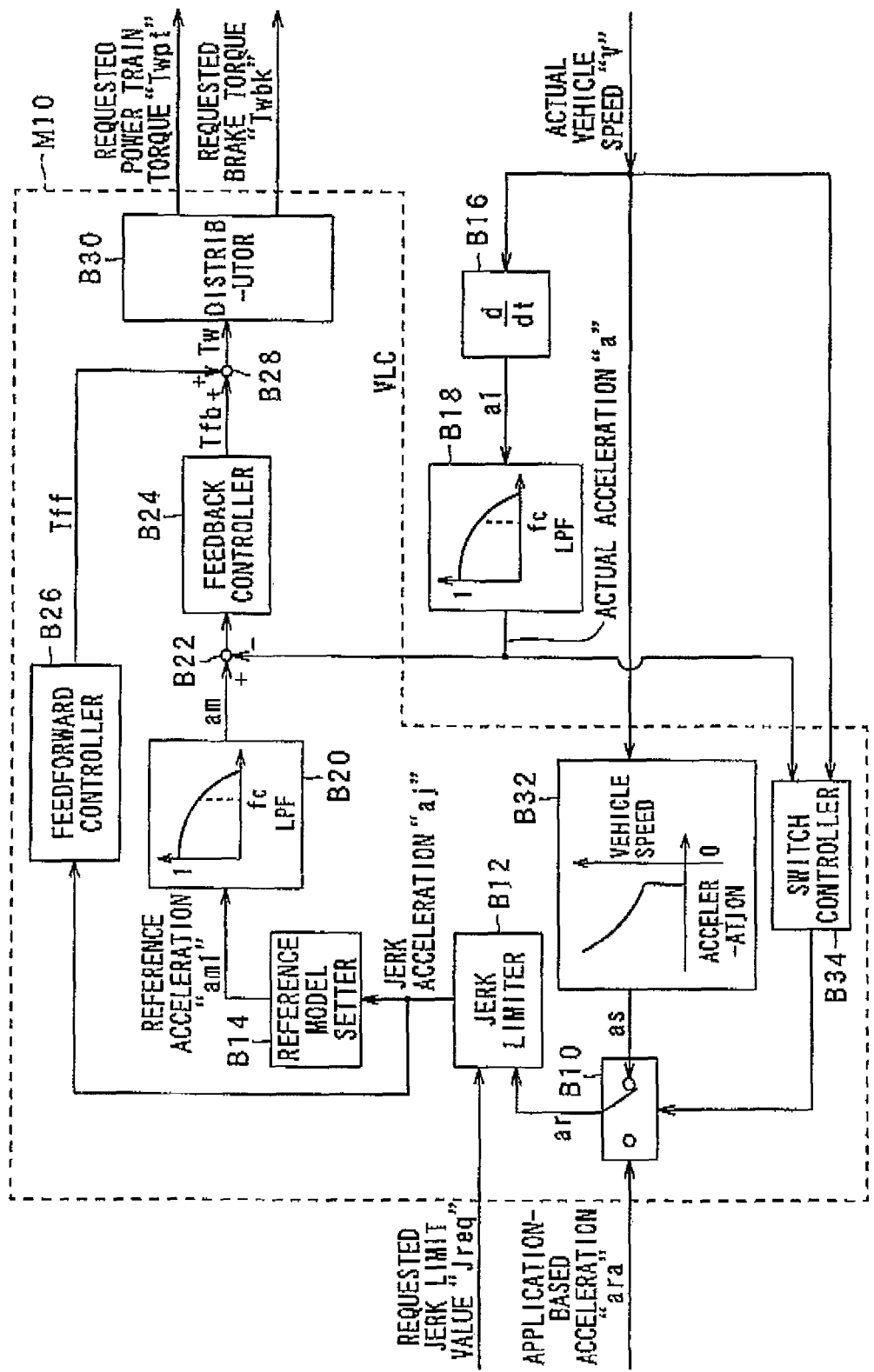
FIG. 3 is a block diagram illustrating in detail the processes performed by a vehicle longitudinal controller, according to the embodiment.

FIG. 3 shows in detail the processes performed by the vehicle longitudinal controller M10.

A selection reference model setter B10 selects either one of the application-based acceleration "ara" outputted from the arbitrator M8 and a soft acceleration "as", which will be described later, and outputs the selected one to a jerk limiter B12, as a requested acceleration "ar". The soft acceleration is prepared for softening the automatic stopping of the vehicle.

The jerk limiter B12 performs a process for limiting the amount of change in the requested acceleration value within one control cycle of the vehicle longitudinal controller M10, to the requested jerk limit value "Jreq" or less.

Figure 4:
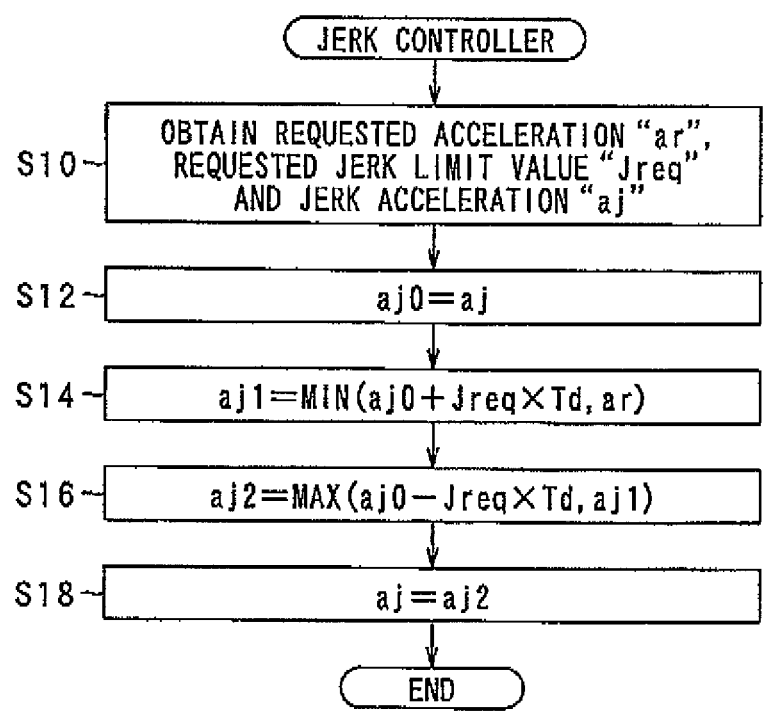
FIG. 4 is a flow diagram illustrating a procedure performed by a jerk limiting reference model setter of the vehicle longitudinal controller.

FIG. 4 shows a series of processes performed by the jerk limiter B12. First, at step S10, the jerk limiter B12 obtains the requested acceleration "ar", the requested jerk limit value "Jreq" and a jerk acceleration "aj" that is the present output of the jerk limiter B12. At the subsequent step S12, the jerk acceleration "a" is set as a previous value "aj0". At steps S14 and S16, the change in the requested acceleration "ar" is limited so that the difference from the previous value "aj0" will be equal to or less than the jerk limit value "Jreq". That is, at step S16, a value "aj1" is calculated, which value corresponds to a value obtained by multiplying the jerk limit value "Jreq" with the control cycle "Td," and adding the resultant value to the previous value "aj0", or corresponds to the requested acceleration "ar"$_1$ whichever is smaller. At the subsequent step S16, a value "aj2" is calculated, which value corresponds to a value obtained by multiplying the jerk limit value "Jreq" with the control cycle "Td" and subtracting resultant value from the previous value "aj0", or corresponds to the smaller value "aj1" mentioned above, whichever is larger. At step S18, the larger value "aj2" is set as the jerk acceleration "aj".

Thus, in one control cycle of the applications, the jerk acceleration "aj" is shifted stepwise to the requested acceleration "ar" at every control cycle "Td" of the vehicle longitudinal controller M10, with the Jerk limit value "Jreq" as being the maximum amount of change.

In the vehicle longitudinal controller M10, the vehicle acceleration is controlled to the jerk acceleration "aj" by two-degree freedom control. In particular, the actual acceleration is feedback-controlled to the jerk acceleration "aj", and at the same time, the actual acceleration is feedforward controlled to the jerk acceleration "aj". An explanation will be given first on the feedback control.

<Feedback Control>

Figure 5A:
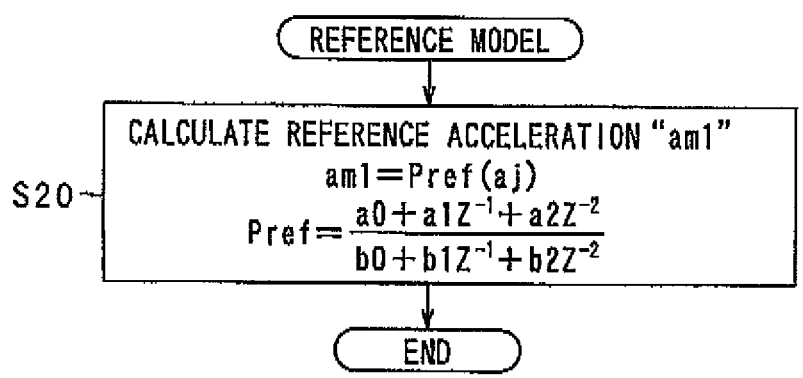
FIG. 5A is a flow diagram illustrating a procedure performed by a reference model setter of the vehicle longitudinal controller.
Figure 5B:
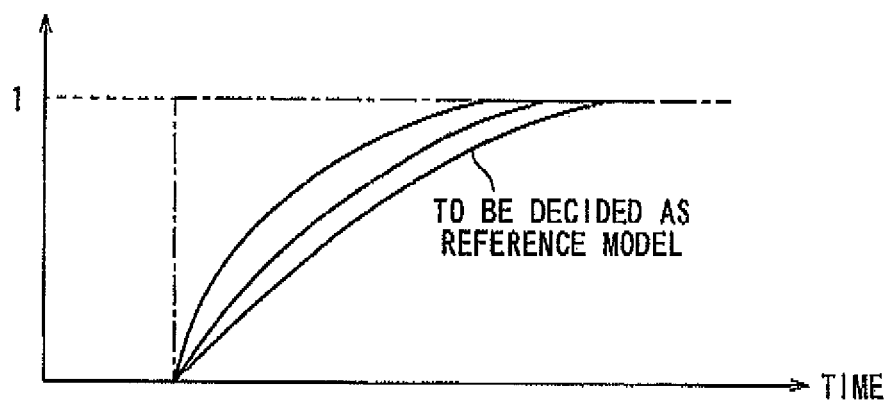
FIG. 5B is a diagram illustrating response characteristics of actual vehicle.

A reference model setter B14 shown in FIG. 3 outputs a reference acceleration "am1" by converting the jerk acceleration "aj" in terms of a reference model. The reference model is to determine a behavior of the target acceleration in a transient travel time period of the vehicle, during which the jerk acceleration "aj" changes. The process performed by the reference model setter B14 is shown in FIG. 5A as step S20. Specifically, the reference model is a primary delay model, and thus the jerk acceleration "aj" is converted in terms of the primary delay model. As shown in FIG. 5B, the primary delay model is set based on the response characteristics at the time when the response delay of the actual acceleration (solid lines) is maximized, in a step change of the target acceleration (dash-dot line). More specifically, the response characteristics are supposed to change according to the operating conditions of the vehicle, such as the rotational speed of the engine 10. Thus, in the changing operating conditions, the characteristics at the time when the response delay is maximized are used as the base for the primary delay model.

A differential operator B16 shown in FIG. 3 performs an operation by differentiating an actual vehicle speed "V" with respect to time. The actual vehicle speed "V" is based on the detection value derived from the wheel-speed sensor 26 provided at each of the drive wheels 16 and the idler wheels 18. In particular, the actual vehicle speed "V" may, for example, be an average of the detection values of the four wheel-speed sensors 26, or a maximum value of the detection values.

A lowpass filter B18 is adapted to perform a filtering process to remove high-frequency components in an actual acceleration "a1" outputted from the differential operator B16. The rotational speed of each of the drive wheels 16 and the idler wheels 18 can be finely fluctuated such as by the influence of the roughness of the road surface. Accordingly, the detection values of the wheel-speed sensors 26 may contain noise components. For this reason, and what with the time-differential operation, the time-differential operation value of the actual vehicle speed "V" (actual acceleration "a1") may include noise is more evident than that in the actual vehicle speed "V". The filtering process of the lowpass filter B18 is carried out in order to remove the noise. In the present embodiment, a Butterworth filter is used as the lowpass filter B18.

On the other hand, a lowpass filter B20 is adapted to output a reference acceleration "am" for the reference acceleration "am1" outputted from the reference model setter B14. The reference acceleration "am" is obtained by applying the same filtering process as that performed by the lowpass filter B18 for the actual acceleration "a1" outputted from the differential operator B16. That is, the lowpass filter B20 carries out the same filtering process as that of the lowpass filter B18.

A difference calculator B22 calculates the difference (difference "err") between an actual acceleration "a" outputted from the lowpass filter 518 and the reference acceleration "am" outputted from the so lowpass filter B20. This difference between the actual acceleration "a" and the reference acceleration "am" represents a value of the past which corresponds to an amount of delay between the lowpass filters B18 and B20.

Figure 6:
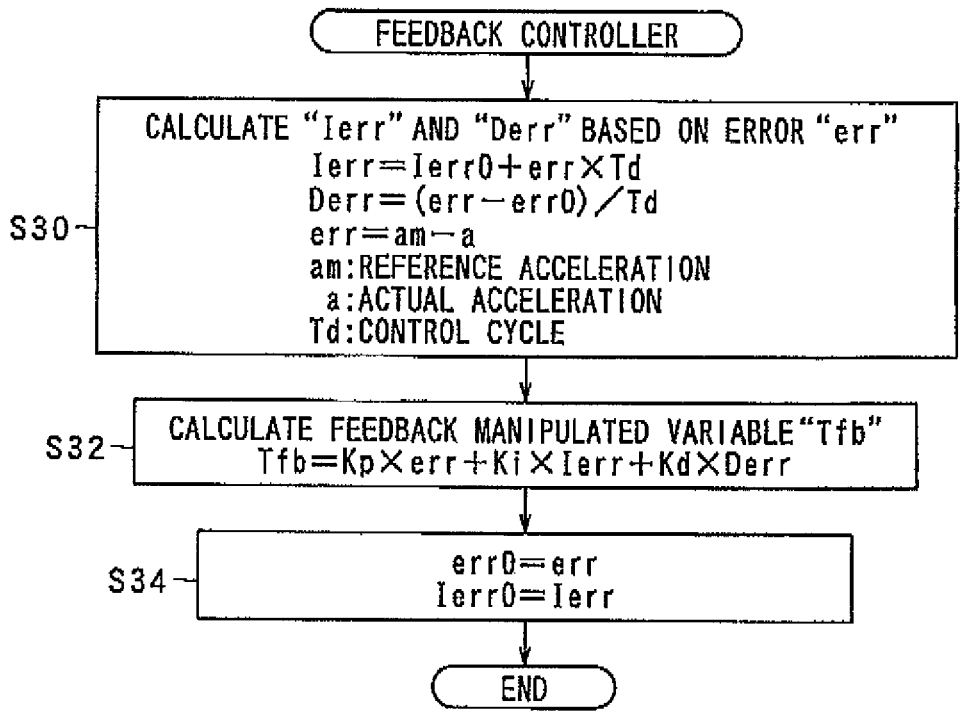
FIG. 6 is a flow diagram illustrating a procedure performed by a feedback controller of the vehicle longitudinal controller.

A feedback controller B24 is adapted to feed back the actual acceleration "a" to the reference acceleration "am". In the present embodiment, in particular, the feedback controller B24 performs proportional-integral-differential (PID) control. FIG. 6 shows a series of processes performed by the feedback controller B24.

First, at step S30, an integral value "Ierr" and a differential value "Derr" are calculated based on the difference "err". Particularly, the current integral value "Ierr" is calculated by multiplying the current difference "err" with the control cycle "Td" and adding the resultant to a previous integral value "Ierr0". Also, the differential value "Derr" is calculated by subtracting a previous difference "err0" from the current difference "err" and dividing the resultant by the control cycle "Td". At the subsequent step S32, a feedback manipulated variable "Tfb" is calculated. Particularly, the feedback manipulated variable "Tfb" is calculated by summing up: a value obtained by multiplying the difference "err" with a proportional gain "Kp"; a value obtained by multiplying the integral value "Ierr" with an integral gain "Ki"; and a value obtained by multiplying the differential value "Derr" with a differential gain "Kd". The proportional gain "Kp", the integral gain "Ki" and the differential gain "Kd" are for converting the integral value "Ierr" and the differential value "Derr" into the requested torque. In other words, the feedback manipulated variable "Tfb" represents a torque requested for rendering the actual acceleration "a" to be the reference acceleration "am". When the process of step S32 is completed, the difference "err" is stored, at step S34, as the previous difference "err0" and the integral value "Ierr" is stored as the previous integral value "Ierr0".

<Feedforward Control>

Hereinafter is explained the feedforward control in the two-degree freedom control mentioned above.

Figure 7:
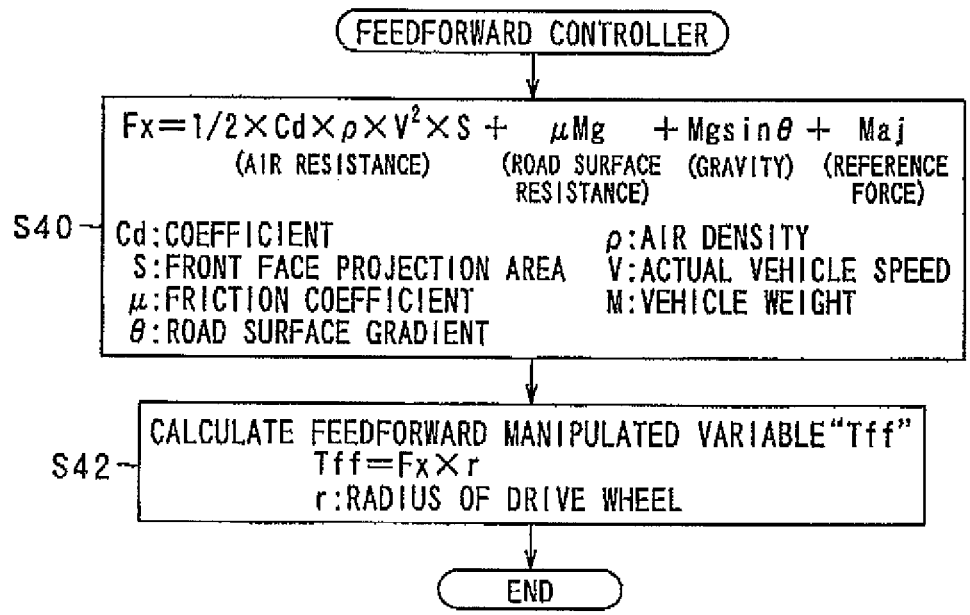
FIG. 7 is a flow diagram illustrating a procedure performed by a feedforward controller of the vehicle longitudinal controller.

A feedforward controller B26 shown in FIG. 3 performs the feedforward control to achieve the jerk acceleration "aj". FIG. 7 shows a series of processes performed by the feedforward controller B26.

First, at step S40, a force "Fx" is calculated, which should be added to the travel direction of the vehicle to achieve the jerk acceleration "an". At this step, the force "Fx" is calculated as a sum of air resistance, road surface resistance, gravity and reference force. The reference force can be obtained by multiplying the jerk acceleration "aj" with a vehicle weight "M". The reference force is necessary for having the vehicle traveled at the jerk acceleration "aj" in the state where no resistance is added in traveling the vehicle. The air resistance is a force of air, which is added in the direction reverse of the travel direction of the vehicle. In the present embodiment, the air resistance is calculated by multiplying the square of the actual vehicle speed "V" with an air density "ρ" a coefficient "Cd" and a projection area "S" of the vehicle front, followed by multiplication with "½". The road surface resistance is a resistance caused by the friction between the road surface and the drive wheels 16 and the idler wheels 18, and is calculated by the multiplication of a friction coefficient "μ", the vehicle weight "M" and a gravity acceleration "g". The term "gravity" refers to a gravity which is applied to the travel direction of the vehicle when the road surface is inclined. This "gravity" can be expressed by "Mg sin θ" using a road surface gradient "θ". It should be appreciated that the road surface gradient "θ" is calculated based on the actual vehicle speed "V" and the detection value of the acceleration sensor 34 mentioned above.

At the subsequent step S42, a feedforward manipulated variable "Tff" is calculated by multiplying the force "Fx" with a radius "r" of the drive wheel 16. The feedforward manipulated variable "Tff" is the torque requested for having the vehicle traveled at the jerk acceleration "aj".

An axle torque calculator B28 shown in FIG. 3 calculates a requested axle torque "Tw" by adding the feedback manipulated variable "Tfb" to the feedforward manipulated variable "Tff".

Figure 8:
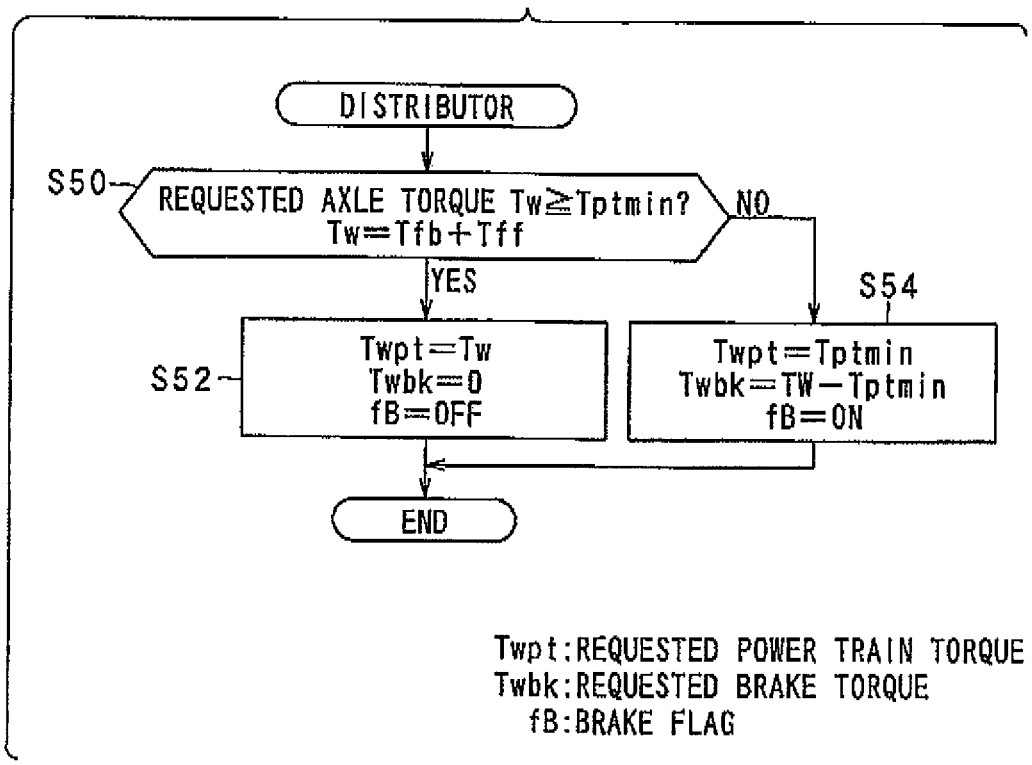
FIG. 8 is a flow diagram illustrating a procedure performed by a distributor of the vehicle longitudinal controller.
Figure 9:
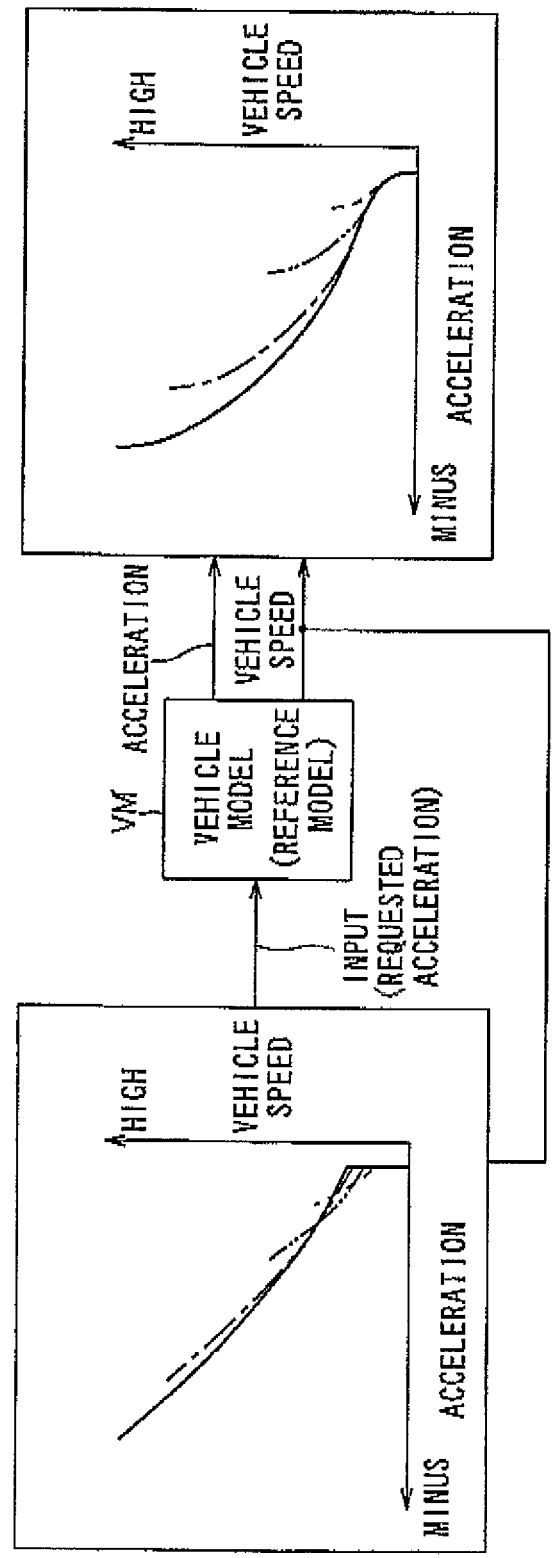
FIG. 9 illustrates a matching technique for soft acceleration, according to the embodiment.

A distributor B30 divides (distributes) the requested axle torque "Tw" into the requested power train torque "Twpt" and the requested brake torque "Twbk". FIG. 8 shows a series of processes performed by the distributor B30.

First, at step S50, it is determined whether or not the requested axle torque "Tw" is equal to or more than a minimal torque "Tptmin". This process determines whether or not the requested axle torque "Tw" can be produced only by the power train. In this regard, the minimal torque "Tptmin" here is the minimal torque that is available by the engine 10 and the automatic transmission system 14. If the requested axle torque "Tw" is equal to or more than the minimal torque "Tptmin", the requested axle torque "Tw" is determined as can be realized only by the power train, and control proceeds to step S52. At step S52, the requested power train torque "Twpt" is set as the requested axle torque "Tw", while the requested brake torque "Twbk" is set to zero. On the other hand, if a negative determination is made at step S50, the requested axle torque "Tw" is determined as cannot be produced only by the power train, and control proceeds to step S54. At step S54, the requested power train torque "Twpt" is set as the minimal torque "Tptmin", and the requested brake torque "Twbk" is set as a value obtained by subtracting the minimal torque "Tptmin" from the requested axle torque "Tw".

According to the series of processes described above, the actual acceleration of the vehicle can be controlled to the jerk acceleration "aj". In the case where the jerk acceleration "aj" changes, the actual acceleration can be properly controlled to the reference acceleration "am1". In other words, in the case where the jerk acceleration "aj" changes and where the acceleration of the vehicle is feedforward controlled to the jerk acceleration "aj", response delay is caused in the actual acceleration with respect to the change in the jerk acceleration "aj", due to the response delay of the vehicle. However, the actual acceleration estimated from the response delay can be approximated to the reference acceleration "am1". In addition, owing to the feedback control, the actual acceleration (the actual acceleration "a1" after removing the delay of the lowpass filter B18) can be controlled to the reference acceleration "am1" with high accuracy.

The application-based acceleration "ara" mentioned above may not necessarily be an appropriate value from the viewpoint of suppressing the shock accompanying the vehicle stop. Therefore, when the vehicle is stopped being requested by the vehicle distance controller M4, for example, shock will probably be generated with the vehicle stop.

In this regard, in the present embodiment, the target acceleration (soft acceleration "as") is set for every actual vehicle speed "V", so that the actual acceleration can be controlled to the soft acceleration "as".

Specifically, as shown in FIG. 3, a soft acceleration setter B32 is provided. The soft acceleration setter B32 has a map for setting the target acceleration (soft acceleration "as") for every travel speed of the vehicle. More specifically, as shown in FIG. 3, the map is set so that a smaller actual vehicle speed will have a smaller absolute value of the acceleration (deceleration). The soft acceleration "as" outputted from the soft acceleration setter B32 is retrieved by the selector B50 mentioned above. A switch controller 534 manipulates the selector B10 to determine the requested acceleration "ar" by selecting either one of the application-based acceleration "ara" and the soft acceleration "as", based on the actual acceleration "a" and the actual vehicle speed "V".

Thus, in stopping the vehicle, the soft acceleration "as" is selected to control the actual acceleration of the vehicle to the soft acceleration "as". However, as described above, in the case where the jerk acceleration "aj" changes, a response delay is caused in the actual acceleration. Thus, arbitrary setting of the soft acceleration "as" may likely to permit the locus of the actual acceleration of the vehicle and the actual vehicle speed "V" in the vehicle stop, to be drastically deviated from a desired locus. Therefore, in the present embodiment, the soft acceleration "as" is matched using the mode shown in FIG. 9.

Specifically, a plurality of patterns is inputted to a vehicle model "VM" which expresses the response characteristics of the acceleration of a vehicle to be controlled, so that acceleration can be variously set for every vehicle speed. In this case, the locus of the acceleration and the vehicle speed outputted from the vehicle model "VM" is considered to be the one that will be presented by the actual vehicle in the case where a target acceleration (soft acceleration "as") has been set according to the inputted pattern. Thus, among the loci outputted from the vehicle model "VM", a particularly proper locus is selected for reducing the shock in stopping the vehicle, and based on the inputted pattern corresponding to the selected locus, a target acceleration (soft acceleration "as") is set. In this way, the shock in vehicle stop can be properly suppressed irrespective of the response delay of the actual vehicle.

In the present embodiment, in particular, the reference model set in the reference model setter B14 of FIG. 3 is used as the vehicle model "VM". This is because, in the present embodiment, the actual acceleration can be controlled to the acceleration determined by the reference model, owing to the feedback control. Thus, the vehicle model "VM" should preferably be identical with the reference model used for the model follow-up control in the control apparatus 30. Use of identical models may allow the vehicle model "VM" to highly accurately simulate the behavior of the actual vehicle in the stop control.

The vehicle model VM is a mathematical model stored in a memory of the vehicle longitudinal controller M10. The vehicle model VM may be produced for every vehicle on which the control apparatus 30 is mounted or may be produced in accordance with a representative vehicle performance.

Figure 10:
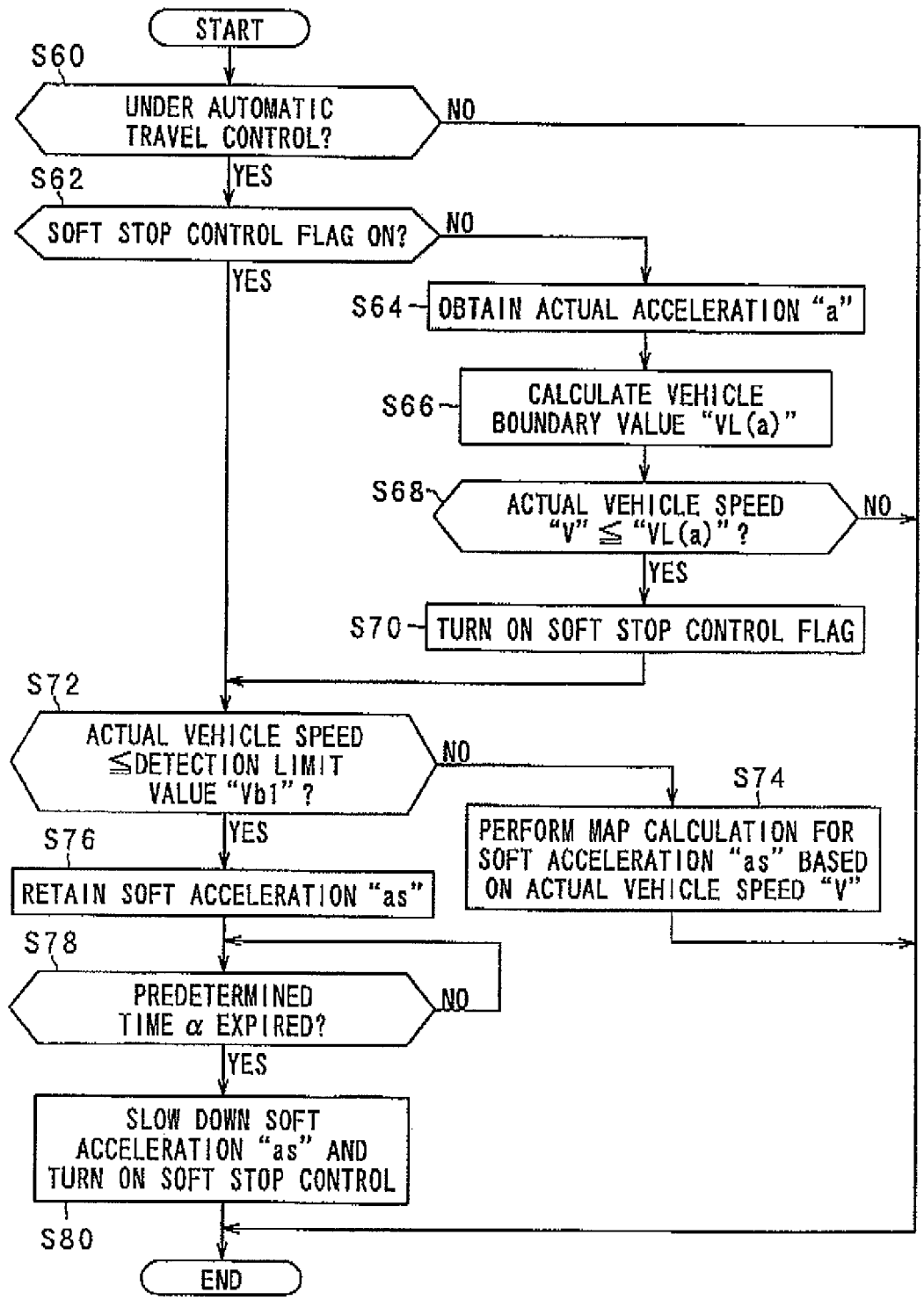
FIG. 10 is a flow diagram illustrating a procedure for vehicle stop control, according to the embodiment.

Hereinafter is described the automatic stop control of vehicle so according to the present embodiment. FIG. 10 shows a series of processes for the automatic stop control. These processes are repeatedly performed at predetermined control cycles, for example, by the control apparatus 30.

First, at step S60, it is determined whether or not the vehicle is under automatic travel control. That is, it is determined whether or not automatic travel has been requested by the user via the user interface 32 and the vehicle is under automatic travel control of the control apparatus 30. If the vehicle is determined as being under the automatic travel control, control proceeds to step S62 where it is determined whether or not a soft stop control flag is in an on-state for the control following up the soft acceleration "as". If a negative determination is made at step S62, control the proceeds to step S64 where the actual acceleration "a" is acquired.

Figure 11:
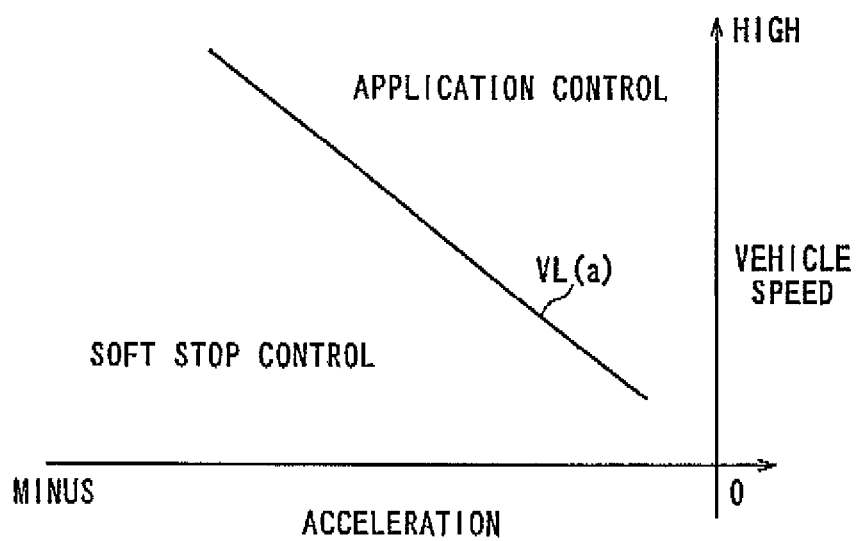
FIG. 11 illustrates a threshold setting technique for making a switch to soft acceleration control in the stop control.

At the subsequent step S66, a vehicle speed boundary value "VL(a)" is calculated to determine the boundary of vehicle speed from when the control based on the soft acceleration "as" is started. As shown in FIG. 11, the vehicle speed boundary value "VL(A)" becomes smaller as the absolute value of the actual acceleration "a" (deceleration) becomes smaller. This is purposed to reliably slow down the deceleration when the vehicle speed is to be substantially zeroed, without prolonging the time required for the vehicle to stop. In other words, if deceleration is slow, the time required for the vehicle speed to be zeroed will be long. Therefore, if control is switched to the soft acceleration "as" at an earlier stage of the slow deceleration, the time required for the vehicle to actually stop is likely to be prolonged. Contrarily, if deceleration is fast, the time required for the vehicle speed to be zeroed will be short. Therefore, if control is switched to the soft acceleration "as" at a later stage of the fast deceleration, the vehicle is stopped in the state of the fast deceleration, which may probably cause a large shock to the vehicle. In this regard, by permitting the control to be shifted to the soft acceleration "as" at lower vehicle speed as the so actual acceleration "a" becomes slower, the deceleration can be reliably slowed down while the vehicle speed is approximated to zero. In addition, the vehicle can be properly suppressed from being caused a shock.

At step S68 of FIG. 10, it is determined whether or not the actual vehicle speed "V" is equal to or lower than the vehicle speed boundary value "VL(a)". This process is purposed to determine whether or not the requirements have been met for the control to be switched to the soft acceleration "as". Then, at step S68, if the actual vehicle speed "V" is determined as being equal to or tower than the vehicle speed boundary value "VL(a)", control proceeds to step S70 where the soft stop control flag is turned on.

When the process of step S70 has been completed, or when an affirmative determination is made at step s62, control proceeds to step S72 where it is determined whether or not the actual vehicle speed "V" is equal to or lower than a detection lower limit "Vb1". The detection lower limit "Vb1" here refers to a lower limit value of a vehicle, which can be detected by the wheel-speed sensor 26. If the actual vehicle speed "V" is determined as being higher than the detection lower limit "Vb1", control proceeds to step S74 where the map calculation is conducted for the soft acceleration "as" based on the actual vehicle speed "V".

On the other hand, if the actual vehicle speed "V" is determined as being equal to or lower than the detection lower limit "Vb1", at step S72, control proceeds to step S76 where control for retaining the soft acceleration "as" is performed. This process is purposed to prevent the soft acceleration "as" from being set at an inappropriate value under the conditions where the actual vehicle speed "V" cannot be detected. This process is performed over a predetermined time "$\alpha$" (step S78). The predetermined time "$\alpha$" is set to the time when the vehicle is estimated to substantially stop. When the predetermined time "$\alpha$" has expired, control proceeds to step S80 where the absolute value of the soft acceleration "as" is once increased, or in other words, the deceleration is once made faster. This process is purposed to once increase the braking force of the vehicle for reliable stopping of the vehicle. Upon completion of this process, the soft stop control flag is turned off.

The series of processes are once ended when a negative determination is made at step S60 or S68, and when the process of step S74 or S80 has been completed.

FIGS. 12A to 12D exemplify a mode of a stop control for vehicle, based on the processes described above. Specifically, FIG. 12A illustrates transition of the application-based acceleration "ara", FIG. 12B illustrates transition of the soft acceleration "as", FIG. 12C illustrates transition of the requested acceleration "ar", and FIG. 12D illustrate transition of the actual vehicle speed "V".

As shown in FIGS. 12A to 12D, with the decrease in the application-based acceleration "ara", the requested acceleration "ar" is decreased. Then, being controlled to follow up these decreases, the actual acceleration "a" is also decreased, whereby the vehicle speed boundary value "VL" is increased. Meanwhile, the actual vehicle speed "V" becomes equal to or lower than the vehicle speed boundary value "VL" by time "t2", and from this time onward, the soft acceleration "as" is employed as the requested acceleration "ar". From time "t3" when the actual vehicle speed "V" becomes equal to or lower than the detection lower limit value "Vb1", the soft acceleration "as" is retained over the predetermined time "$\alpha$". Then, at time "t4" when the predetermined time "$\alpha$" expires, the soft acceleration "as" is once drastically slowed down to permit the brake actuator 20 to increase the braking force. Thus, the deceleration is properly suppressed while the vehicle speed is approximated to zero, and during which the vehicle can be reliably stopped.

According to the present embodiment described above, the following advantages can be obtained.

(1) In stopping a vehicle, a target acceleration (soft acceleration so "as") has been set according to the actual vehicle speed "V" to control the actual acceleration of the vehicle to the soft acceleration "as". In stopping the vehicle, the setting of the soft acceleration "as" enables control for preventing the absolute value of the actual acceleration from being excessively increased, or in other words, enables control for preventing deceleration from becoming excessively fast. Thus, the shock that would be caused in stopping the vehicle can be properly mitigated.

(2) The absolute value of soft acceleration "as" has been decreased as the actual vehicle speed "V" has been decreased. Thus, the shock that would be caused in stopping the vehicle can be properly mitigated.

(3) Various patterns have been inputted to the vehicle model "VM", as to the target value of acceleration for every travel speed. Then, the soft acceleration "as" has been matched, based on the outputted pattern of the travel speed and the acceleration. Thus, the soft acceleration "as" can be set so that the actual vehicle can present a desired locus as to the travel-speed and the acceleration.

(4) The actual acceleration has been feedback-controlled to the reference acceleration "am1" which is the jerk acceleration "aj" converted in terms of the reference model. At the same time, two-degree freedom control of model follow-up type has been conducted, so that the actual acceleration of the vehicle can be subjected to feedforward control according to the target acceleration. Thus, the actual acceleration can be highly accurately controlled to the reference acceleration "am1".

(5) The reference model has represented a model in which a response delay is caused with respect to the target acceleration of the vehicle to be controlled. Thus, the actual acceleration that can be estimated in controlling the acceleration of the vehicle to the target acceleration, can be rendered to be the reference acceleration "am1". Thus, proper control can be effected without excessively increasing the feedback manipulated variable.

(6) The reference model has been set based on the response characteristics at the time when the response delay is maximized for the change in the target acceleration. Thus, control can be easily and properly effected, while the feedback manipulated variable can be prevented from becoming excessively large.

(7) In detecting the acceleration of the vehicle based on the time-differential operation of the actual vehicle speed "V", a filtering process has been applied, and the same filtering process has also been applied to the reference acceleration "am1" outputted from the reference model setter B14. Thus, the control to the reference acceleration "am1" is enabled. At the same time, compensation can be made for the influence of the delay on the time-differential operation value of the actual vehicle speed "V", the delay being ascribed to the filtering process.

(8) The soft acceleration "as" has been retained over the predetermined time "α" in the case where the actual vehicle speed "V" becomes equal to or lower than a predetermined speed. Thus, under the conditions where the actual vehicle speed "V" cannot be detected, the soft acceleration "as" can be prevented from becoming an excessively improper value.

(9) The vehicle speed boundary value "VL" has been reduced as the absolute value of the actual acceleration "a" is reduced. Thus, the time required for stopping the vehicle can be prevented from being prolonged. At the same time, it is possible to reliably prevent the excessive increase in the absolute value of the actual acceleration right before the actual vehicle speed is zeroed.

(Modifications)

The embodiment described above can be modified as follows.

In the embodiment described above, the reference model has been set based on the response characteristics at the time when the response delay of the actual acceleration is maximized with respect to the step change of the target acceleration. Alternatively, for example, the reference model may be variably set according to the response characteristics for every operating condition of the vehicle. Also, the reference model is not limited to the primary delay mode, but may, for example, be a secondary delay model.

In the embodiment described above, in matching the soft acceleration "as" with every actual vehicle speed "V", the reference model set by the reference model setter B14 has been used as the vehicle model "VM". Alternatively, for example, the vehicle model "VM" may be represented by the response characteristics corresponding to every operating condition of the actual vehicle.

The feedback controller B24 is not limited to the one that performs PID (proportional-integral-differential) control, but may be the one that performs either one of or any two of P control, I control and D control.

The feedforward controller B26 is not limited to the one that performs the processes described above. The feedforward controller B26 may calculate the feedforward manipulated variable "Tff" only from the reference force "Maj", for example. Also, the feedforward manipulated variable "Tff" may be calculated using either one of or any two of the air resistance, the road surface resistance and the gravity.

In the embodiment described above, the two-degree freedom control has been performed. Alternatively, for example, only feedback control, such as the PID control, may be performed. In this case as well, the shock that would be caused in stopping the vehicle can be mitigated by setting a target acceleration (soft acceleration "as") according to the actual vehicle speed "V". In this case, in particular, the target acceleration (soft acceleration "as") may be matched based on a vehicle model, whereby the actual acceleration "a" can be permitted to properly follow up the soft acceleration "as".

In the embodiment described above, the model follow-up control has been performed. Alternative to this, the reference model setter B14 may not be provided. In this case as well, shock that would be caused in stopping the vehicle can be mitigated by setting a target acceleration (soft acceleration "as") according to the actual vehicle speed "V". In this case, in particular, the target acceleration (soft acceleration "as") may be matched based on a vehicle model, whereby the actual acceleration "a" can be permitted to properly follow up the soft acceleration "as".

The lowpass filters B20 and B18 are not limited to the Butterworth filters, but may, for example, be primary delay filters. In this case, the two lowpass filters 920 and B18 are intended to perform the same filtering process.

In the acceleration control in the embodiment described above, the means for imparting positive torque to the vehicle (more particularly the drive wheels 16 of the vehicle) has been exemplified by the power train, i.e. motive power generator, including the engine 10 and the automatic transmission system 14. Alternatively, however, a motor may be used, for example, as the motive power generator. Also, the automatic transmission system 14 may not necessarily be the one having a planetary gear automatic transmission, but may, for example, be the one having a continuously variable transmission (CVT) which is able to adjust the gear ratio in a continuous manner.

In the acceleration control in the embodiment described above, the means for imparting negative torque to the vehicle (more particularly the drive wheels 16 of the vehicle) has been exemplified by the hydraulic brake actuator. Alternatively, however, a generator may be used, for example, which converts the torque of wheels (drive wheels 16 and the idler wheels 18) into electric energy.

In the above configurations according the embodiment and modifications thereof, two-degree freedom control is used, in which feedback control and feedforward control are combined. Thus, the actual acceleration can be controlled to the target acceleration that is the acceleration converted in terms of the reference model. The detection value of the rotational speed of a wheel includes noise caused by the roughness of the road surface, for example. Therefore, the detection values fluctuate in a fine time scale. For this reason, it is likely that the time-differential operation value based on the detection value of the rotational speed of the vehicle may be considerably influenced by the fluctuation. Thus, instead of directly using the time-differential operation value as an acceleration of the vehicle, the value is desired to be subjected to filtering process. However, since a delay may be caused in performing such a filtering process, it may be difficult to control the actual acceleration to the acceleration determined by the reference model. In this regard, in the above configuration, the output of the reference model is also subjected to the same filtering process. This can compensate the influence of the delay, which is caused by the filtering process, on the time-differential operation value based on the detection value. At the same time, feedback control can be performed to realize the acceleration determined by the reference model.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A control apparatus for controlling stopping of a vehicle, comprising:

a speed detector that detects a speed of a vehicle; and
a control unit that controls an automatic stop of the vehicle, wherein the control unit comprises automatic stop means for stopping the vehicle automatically when a predetermined operating condition of the vehicle is met;
speed acquiring means for acquiring an actual speed of the vehicle from detected results of the speed detector;
target setting means for setting a target acceleration of the vehicle depending on the actual speed when the vehicle is stopped automatically by the automatic stop means; and
control means for controlling an actual acceleration of the vehicle at the target acceleration,
wherein the target setting means has a vehicle model to which different target acceleration so patterns depending on different travels speeds of the vehicle are given and from which travel speeds and accelerations are outputted depending on the inputted target acceleration patterns, and
the target acceleration is adapted based on both the travel speeds and the accelerations outputted from the vehicle model.

2. A control apparatus for controlling stopping of a vehicle, comprising:

a speed detector that detects a speed of a vehicle; and
a controller that controls an automatic stop of the vehicle and that is cooperatively operable with the speed detector, wherein the controller is configured to:
cause the vehicle to stop automatically when a predetermined operating condition of the vehicle is met;
acquire an actual speed of the vehicle from detected results of the speed detector;
set a target acceleration of the vehicle depending on the actual speed when the vehicle is caused to be stopped automatically, the target acceleration being set so that an absolute value of the target acceleration decreases as the actual speed of the vehicle indicated by the speed detector decreases;
detect an acceleration of a vehicle;
acquire an actual acceleration of the vehicle from the detected acceleration;
determine, based on the actual acceleration and the actual speed, whether or not control of the actual acceleration is to be started, a determination is to start control of the actual acceleration of the vehicle to the target acceleration when an absolute value of the actual speed is made smaller as an absolute value of the actual acceleration becomes smaller; and
control the actual acceleration of the vehicle to the target acceleration instead of to a requested acceleration, when the determination is to start control of the actual acceleration of the vehicle.

* * * * *